(12) United States Patent
Nozaki et al.

(10) Patent No.: US 9,157,524 B2
(45) Date of Patent: Oct. 13, 2015

(54) VEHICLE TRANSMISSION

(71) Applicant: HONDA MOTOR CO., LTD., Tokyo (JP)

(72) Inventors: Yasuhiro Nozaki, Wako (JP); Kousuke Tsunashima, Wako (JP); Eiji Kittaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/446,267

(22) Filed: Jul. 29, 2014

(65) Prior Publication Data

US 2015/0094919 A1   Apr. 2, 2015

(30) Foreign Application Priority Data

Sep. 30, 2013 (JP) .................................. 2013-205655

(51) Int. Cl.
*F16H 61/02* (2006.01)
*F16H 61/00* (2006.01)
*F16H 61/04* (2006.01)

(52) U.S. Cl.
CPC .... *F16H 61/0213* (2013.01); *F16H 2061/0096* (2013.01); *F16H 2061/0227* (2013.01); *F16H 2061/0459* (2013.01)

(58) Field of Classification Search
None
See application file for complete search history.

(56) References Cited

U.S. PATENT DOCUMENTS

| | | | | |
|---|---|---|---|---|
| 6,456,918 | B2 * | 9/2002 | Nanri | 701/51 |
| 2001/0005705 | A1 * | 6/2001 | Kon et al. | 477/156 |
| 2002/0072449 | A1 * | 6/2002 | Iwase et al. | 477/97 |
| 2003/0119630 | A1 * | 6/2003 | Edelen et al. | 477/115 |
| 2007/0066444 | A1 * | 3/2007 | Matsudaira et al. | 477/115 |
| 2008/0221760 | A1 * | 9/2008 | Wakamatsu et al. | 701/52 |
| 2014/0214288 | A1 * | 7/2014 | Tokura et al. | 701/52 |

FOREIGN PATENT DOCUMENTS

JP   58-23279 B2   5/1981

* cited by examiner

*Primary Examiner* — Justin Holmes
(74) *Attorney, Agent, or Firm* — Mori & Ward, LLP

(57) ABSTRACT

A vehicle transmission includes a main transmission, a sub-transmission, a sub-transmission shift position sensor, and a map switching device. The main transmission is an automatic transmission configured to perform gear shifting according to a gear shift map selected between a first gear shift map and a second gear shift map in accordance with a throttle opening degree and a vehicle speed. The sub-transmission is configured to change rotational speed of rotational drive force output from the main transmission by manually selecting a sub-transmission gear position between a drive position and a low position having a reduction ratio larger than a reduction ratio of the drive position. The map switching device is configured to perform switching between the first gear shift map and the second gear shift map in accordance with sensing signals from the sub-transmission shift position sensor.

11 Claims, 13 Drawing Sheets

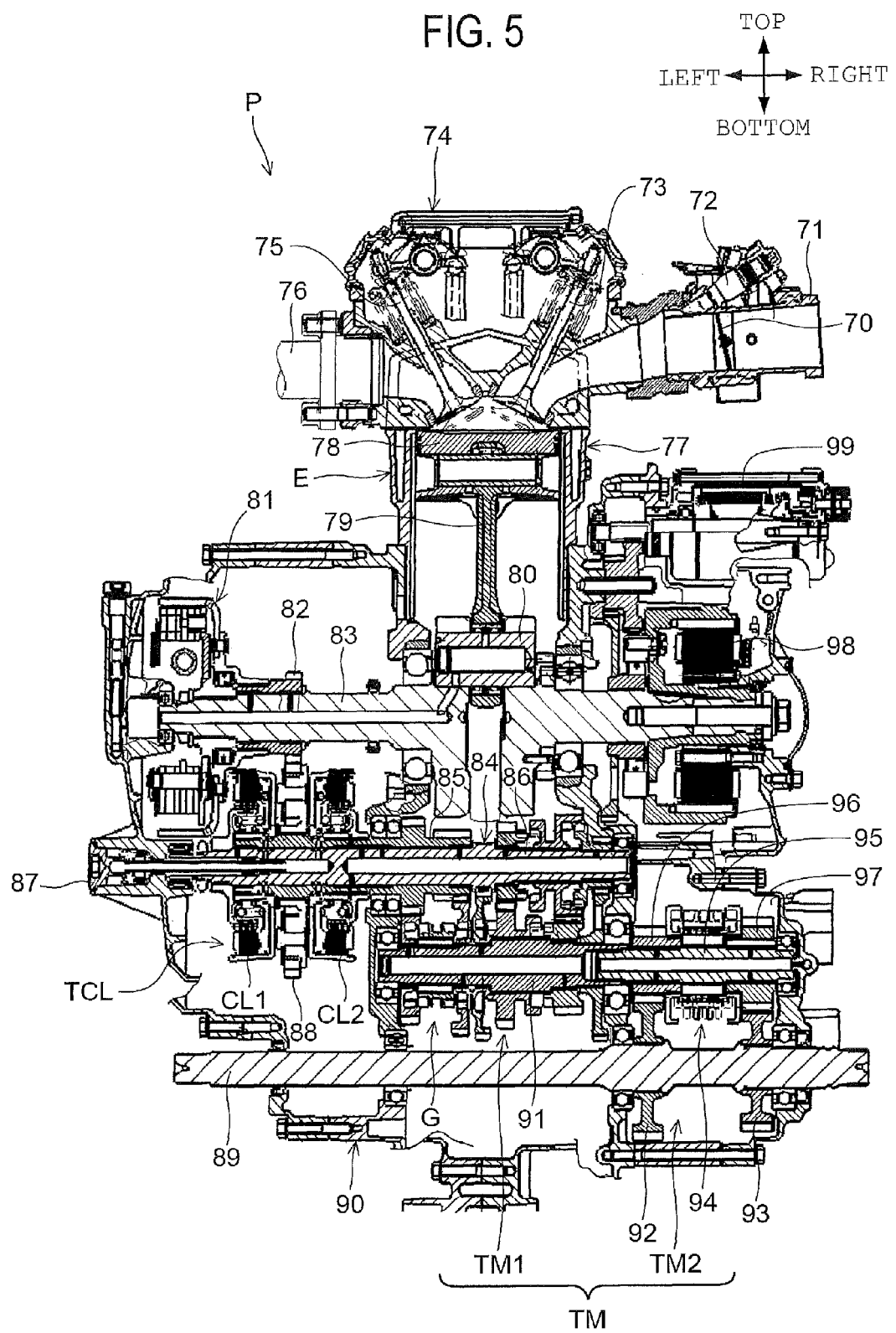

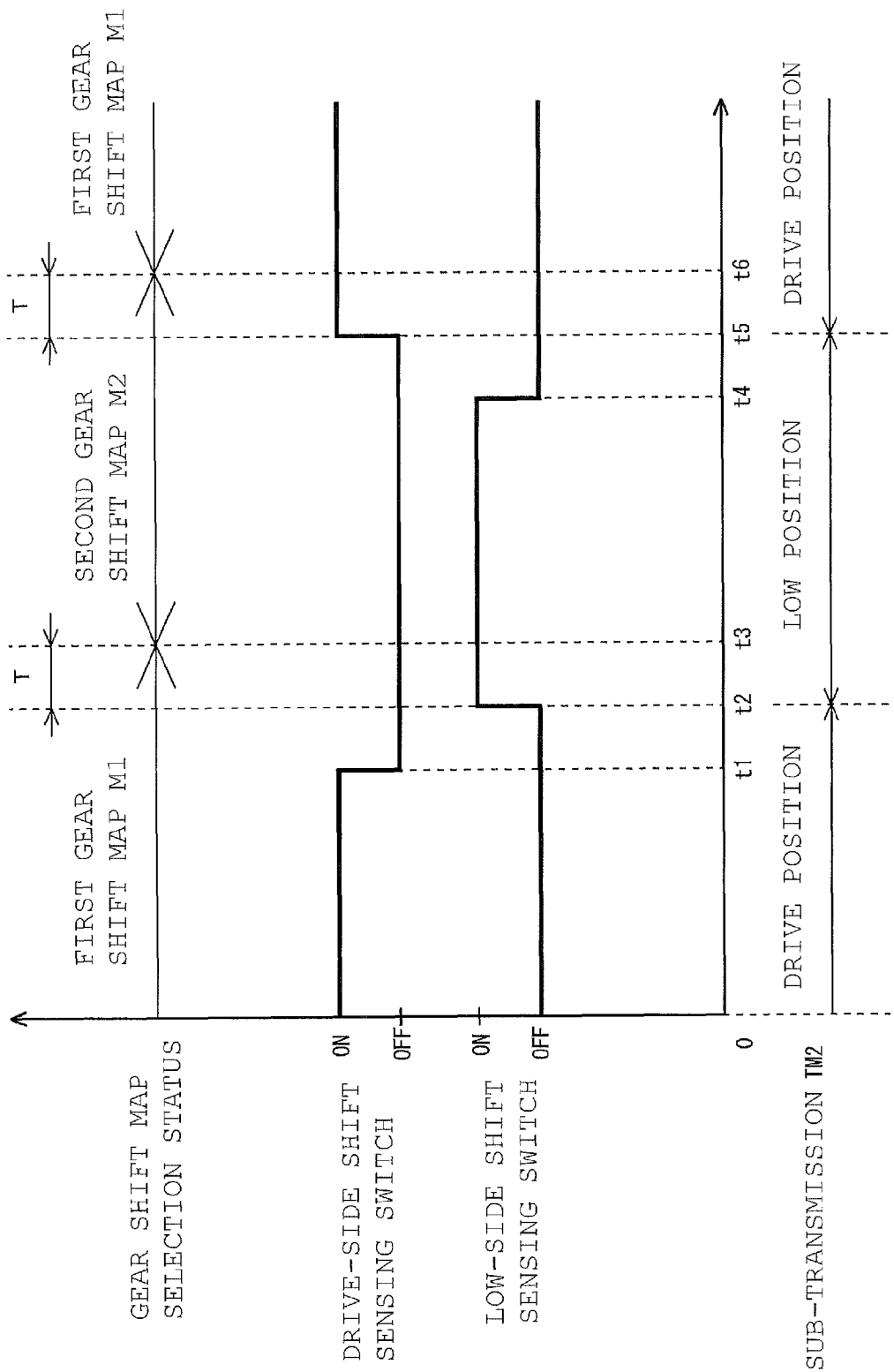

VEHICLE TRANSMISSION

CROSS-REFERENCE TO RELATED APPLICATIONS

The present application claims priority under 35 U. S. C. §119 to Japanese Patent Application No. 2013-205655, filed Sep. 30, 2013, entitled "Vehicle Transmission." The contents of this application are incorporated herein by reference in their entirety.

BACKGROUND OF THE INVENTION

1. Field of the Invention

The present invention relates to a vehicle transmission.

2. Discussion of the Background

Conventionally, a vehicle transmission has been known which includes a main transmission configured to output the number of revolutions per unit time of a power source at a predetermined gear ratio by performing switching between plural speed-changing gear pairs and a sub-transmission disposed downstream of the main transmission and configured to convert the output of the main transmission selectively at one of two different gear ratios.

Japanese Examined Patent Publication No. S58-023279 discloses a motorcycle transmission in which both of a five-forward speed main transmission and a sub-transmission for converting the output of the main transmission selectively at one of two different gear ratios are switched by manual operations. With such a sub-transmission, a wider speed range can be obtained than in a configuration including only a main transmission, and the convenience of a vehicle can be improved.

SUMMARY OF THE INVENTION

According to one aspect of the present invention, a vehicle transmission includes a main transmission, a sub-transmission, main transmission shift position sensing means, and sub-transmission shift position sensing means. The main transmission is configured to output the number of revolutions per unit time of a power source at a predetermined gear ratio by performing switching between a plurality of speed-changing gear pairs. The sub-transmission is disposed downstream of the main transmission and configured to convert an output of the main transmission selectively at one of two different gear ratios. The sub-transmission is configured to be switched by a manual operation. The main transmission shift position sensing means is for sensing a gear position of the main transmission. The sub-transmission shift position sensing means is for sensing a gear position of the sub-transmission. The main transmission is an automatic transmission which performs gear shifting with gear shift timing according to one of gear shift maps, the one gear shift map being selected in accordance with a throttle opening degree of a vehicle and a vehicle speed, the sub-transmission is configured to be switched between a drive position and a low position having a larger reduction ratio than the drive position, the gear shift maps include a first gear shift map corresponding to the drive position of the sub-transmission and a second gear shift map corresponding to the low position thereof, and the vehicle transmission further includes map switching means for performing switching between the first gear shift map and the second gear shift map in accordance with sensing signals from the sub-transmission shift position sensing means.

According to another aspect of the present invention, a vehicle transmission includes a main transmission, a sub-transmission, a sub-transmission shift position sensor, and a map switching device. The main transmission is configured to output rotational drive force generated by a power source at a predetermined gear ratio by selecting a main transmission gear position among a plurality of speed-changing gear pairs. The main transmission is an automatic transmission configured to perform gear shifting according to a gear shift map selected between a first gear shift map and a second gear shift map in accordance with a throttle opening degree and a vehicle speed. The sub-transmission is configured to change rotational speed of the rotational drive force output from the main transmission by manually selecting a sub-transmission gear position between a drive position and a low position having a reduction ratio larger than a reduction ratio of the drive position. The first gear shift map corresponds to the drive position. The second gear shift map corresponds to the low position. The sub-transmission shift position sensor is configured to sense the sub-transmission gear position of the sub-transmission. The map switching device is configured to perform switching between the first gear shift map and the second gear shift map in accordance with sensing signals from the sub-transmission shift position sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a cross-sectional view of a power unit.

FIG. 13 is a timing diagram showing the timing of switching between the gear shift maps.

DESCRIPTION OF THE EMBODIMENTS

Figure 1:
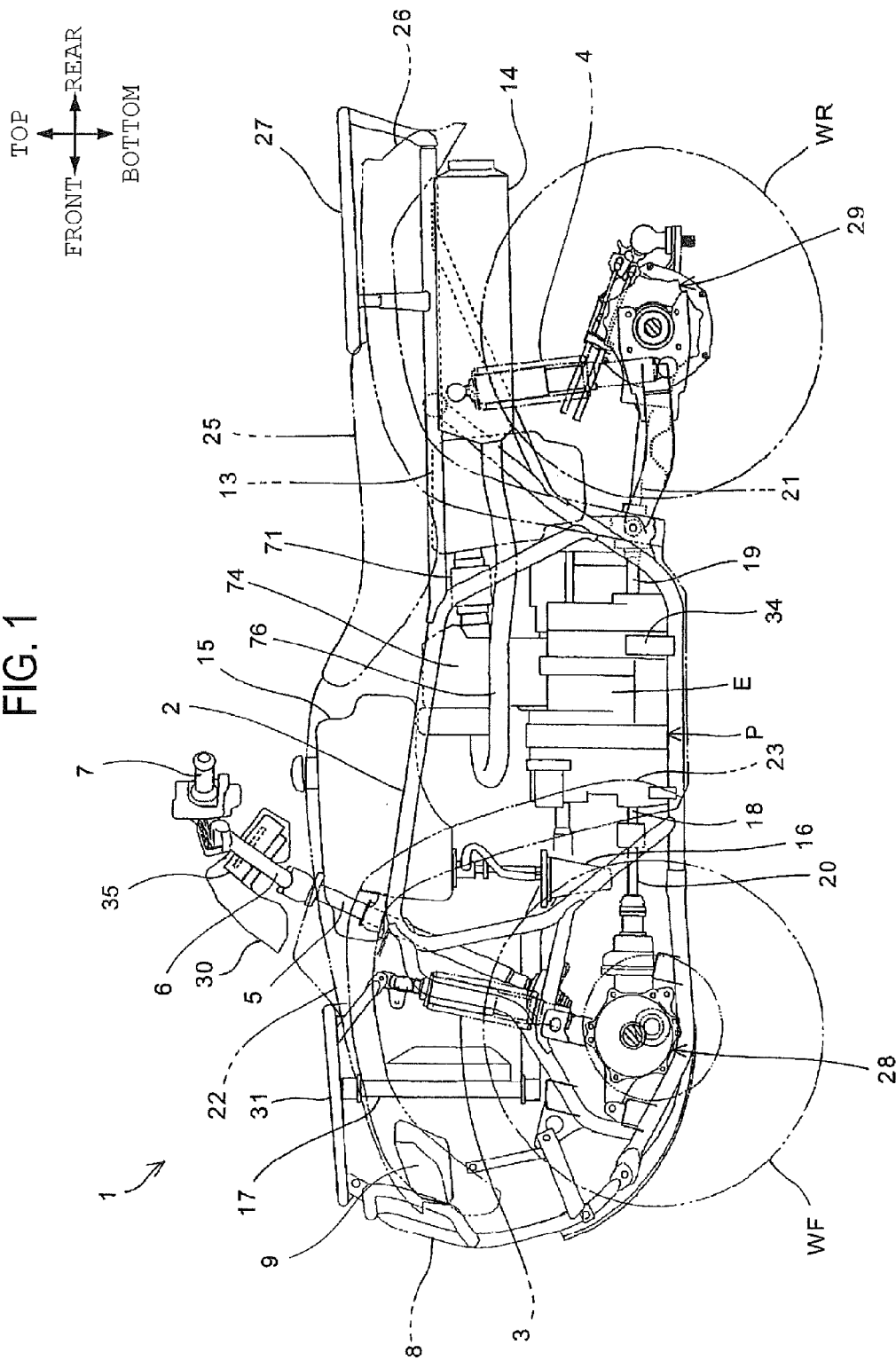
FIG. 1 is a left side view of an ATV (All Terrain Vehicle) to which a vehicle transmission according to one embodiment of the present invention is applied.

The embodiments will now be described with reference to the accompanying drawings, wherein like reference numerals designate corresponding or identical elements throughout the various drawings.

Figure 2:
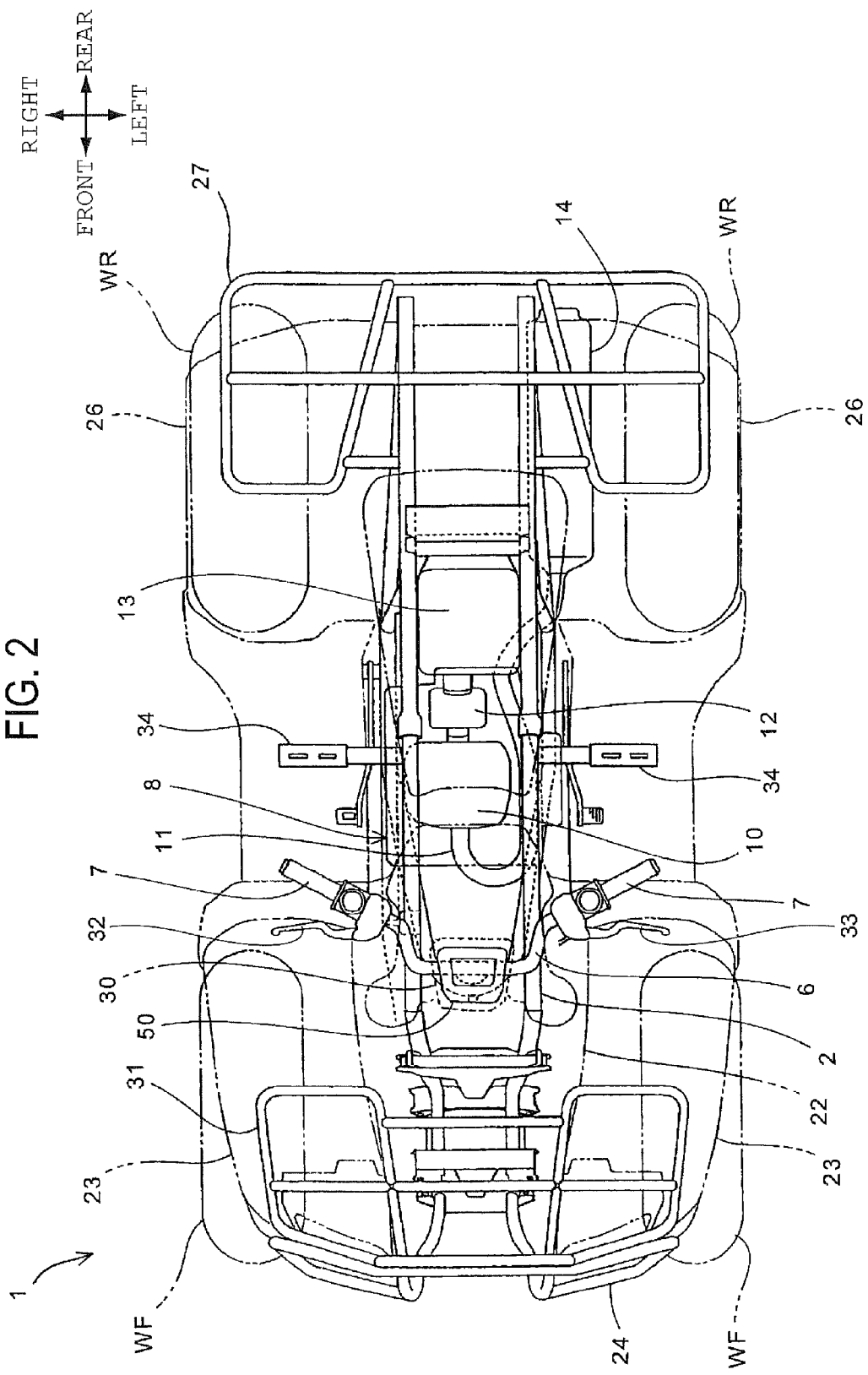
FIG. 2 is a plan view of the ATV.

Hereinafter, an embodiment of the present invention will be described in detail with reference to the drawings. FIG. 1 is a side view of an ATV (All Terrain Vehicle) 1 to which a vehicle transmission according to one embodiment of the present invention is applied. Moreover, FIG. 2 is a plan view of the ATV 1. The ATV 1 is an all-terrain saddle-type four-wheeled vehicle having a compact, light-weight body and low-pressure balloon tires with large diameters to ensure a high ground clearance and particularly improve the ability to travel to a desired location on rough terrain. The ATV 1 is a multipurpose four-wheeled vehicle in which a pair of left and right front wheels WF and a pair of left and right rear wheels WR are rotatably supported by a body frame 2, and which travels by driving forces supplied from a transmission-incorporating power unit P disposed in a lower portion of the body nearer the rear thereof to the rear wheels or all of the front and rear wheels.

The front wheels WF and the rear wheels WR are attached to front and rear portions of the body frame 2 with front suspensions 3 and rear suspensions 4 interposed therebetween. An engine E as a drive source is mounted in an approximately central portion of the body frame 2 by longitudinal mounting in which a crankshaft of the engine E is oriented along the longitudinal axis of the vehicle. The engine E of the power unit P is configured such that a cylinder head 74 is installed upright in an upper portion of the body.

The rotational driving force of the engine E is transmitted from offset positions shifted to a left side of the engine E in the lateral direction of the vehicle toward the front and the rear through a front output shaft 18 and a rear output shaft 19 coupled to a final output shaft 89 (see FIG. 5), respectively. The rotational driving forces transmitted to the output shafts 18 and 19 are transmitted to the front and rear wheels WF and WR through front and rear drive shafts 20 and 21 and front and rear final reduction gear units 28 and 29.

A throttle body 71 is connected to a rear portion of the cylinder head 74. An air cleaner case 13 is connected to a rear portion of the throttle body 71. Moreover, a base end portion of an exhaust pipe 76 is connected to a front portion of the cylinder head 74. The exhaust pipe 76 is curved back in front of the cylinder head 74, extended backward while passing the left side of the cylinder head 74 with respect to the lateral direction of the vehicle to be connected to a muffler 14.

A steering shaft 5 is coupled to a lower portion of a steering handle 6 having handle grips 7 attached to left and right end portions thereof. A lower end portion of the steering shaft 5 is coupled to front wheel steering mechanism. A radiator 17 for water used to cool the engine E is disposed on the vehicle front side of the steering shaft 5, and a fuel tank 15 having a fill cap 15a is disposed on the vehicle rear side of the steering shaft 5. A fuel pump 16 which pumps fuel into an unillustrated fuel injection device is disposed under the fuel tank 15, and a seat 25 is disposed behind the fuel tank 15.

A front cover 22 covering a front portion of the vehicle, a pair of left and right front fenders 23 covering the front wheels WF from upper portions thereof to rear portions thereof, a front bumper 8, and a front carrier 31 are attached to a front portion of the body frame 2. A pair of left and right headlamps 9 are disposed behind the front bumper 8. Moreover, rear fenders 26 covering the rear wheels WR from upper portions thereof to front portions thereof and a rear carrier 27 are attached to a rear portion of the body frame 2. Footrests 34 for a rider are disposed to the left and right of the engine E with respect to the lateral direction of the vehicle. A meter device 35 is disposed at the center of the steering handle 6 with respect to the lateral direction of the vehicle while covered with a meter cover 30.

Figure 3:
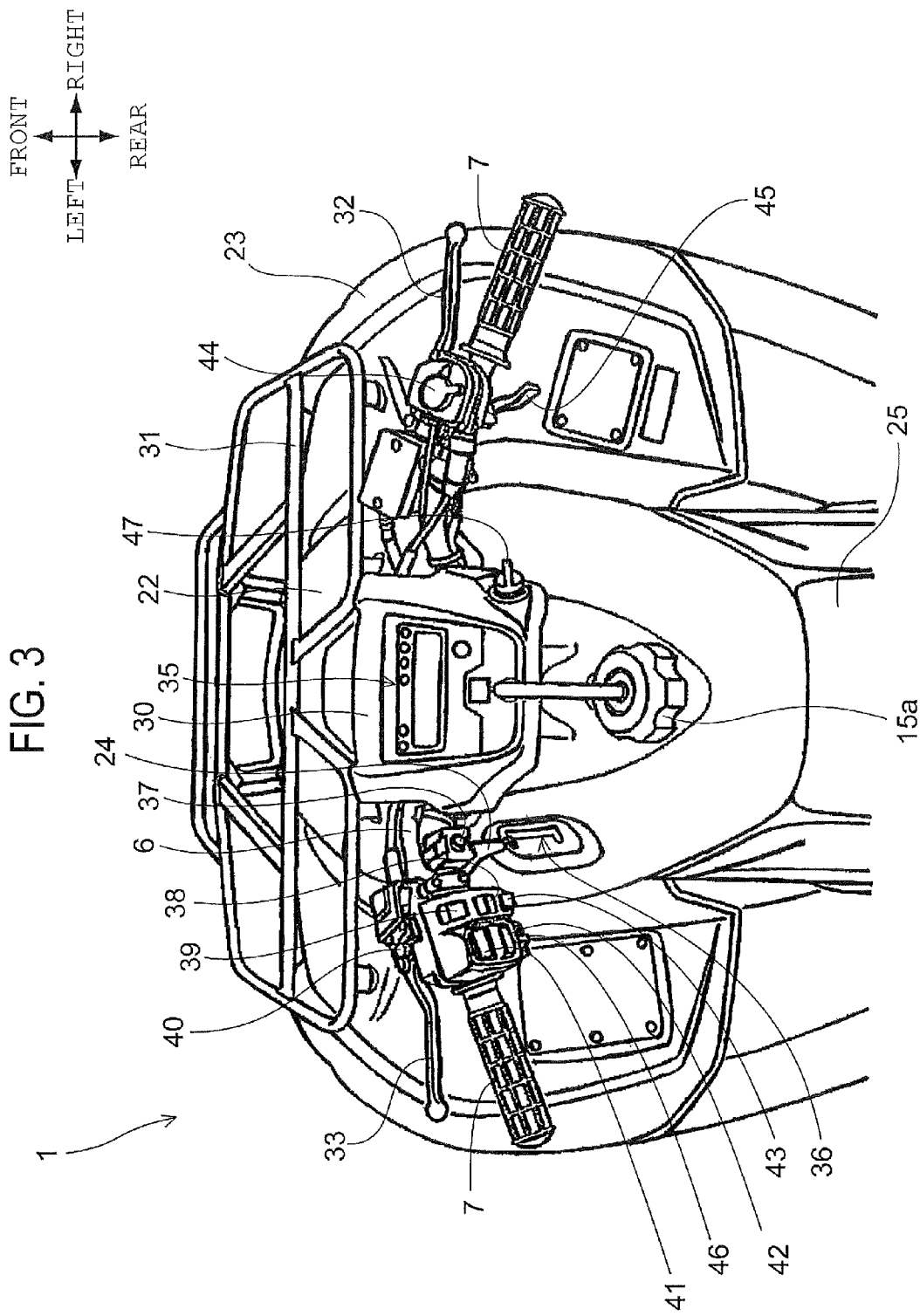
FIG. 3 is a view for explaining the configuration of the ATV around a handle.

FIG. 3 is a view for explaining the configuration of the ATV 1 around the handle. The meter device 35, including a speedometer, a distance meter, various kinds of indicators, and the like, is disposed a recessed portion at the center of the steering handle 6 with respect to the lateral direction of the vehicle. A control knob 47 for a main switch is disposed on the right side of the meter cover 30 with respect to the lateral direction of the vehicle. A four-wheel brake lever 32 for actuating braking systems of the front and rear wheels WF and WR is attached to the right side of the steering handle 6. A throttle lever 45 operated by a right thumb and a travel mode changing switch 44 are disposed on a base portion of the four-wheel brake lever 32.

A rear wheel brake lever 33 for actuating the braking systems of the rear wheels WR and a horn button 37 are attached to the left side of the steering handle 6. A switch casing, which is disposed between a base portion of the rear wheel brake lever 33 and the handle grip 7, has an on/off switch 38 for the headlamps 9, an optical axis changing switch 39 for the headlamps 9, a starter button 43, a shift-up switch 41, a shift-down switch 42, and an engine stop switch 46.

The power unit P of the ATV 1 includes a transmission (see FIG. 5) including a main transmission which has five forward speeds and one reverse speed to offer a limited number of gear ratios, and a sub-transmission which converts the output of the main transmission selectively at one of two different gear ratios. Of these transmissions, the main transmission is an automatic transmission in which a twin clutch and a shift drum are driven by an actuator, and the sub-transmission is a manual transmission in which a rider directly switches the meshing of the speed-changing gears by a manual operation.

The main transmission is configured to be capable of being switched by operating the travel mode changing switch 44 between an automatic mode in which automatic gear shifting is carried out using throttle opening degree and vehicle speed as parameters and a semiautomatic mode in which gear shifting is carried out in accordance with a switching operation performed by an driver. The shift-up switch 41 and the shift-down switch 42 provided on the left side of the steering handle 6 are operators which are operated by the rider according to a rider's wish to switch the gear position of the main transmission while the semiautomatic mode is being selected. The gear shifting of the main transmission is sequential gear shifting in which the main transmission is shifted from a gear to a next higher or lower gear in the sequence 5-4-3-2-1-N (neutral)-R (reverse), and a reverse select knob 40 which is operated when gear shifting from N to R is performed is provided on a base portion of the rear wheel brake lever 33.

A switching lever 24 for the sub-transmission is disposed to the forward left of the fill cap 15a, under the steering handle 6. The switching lever 24 is configured to be movable along a gate 36 between a drive position (D) located on the forward side of the vehicle and selected during normal travel and a low position (L) located on the backward side of the vehicle and selected during travel on rough terrain or slopes.

Figure 4:
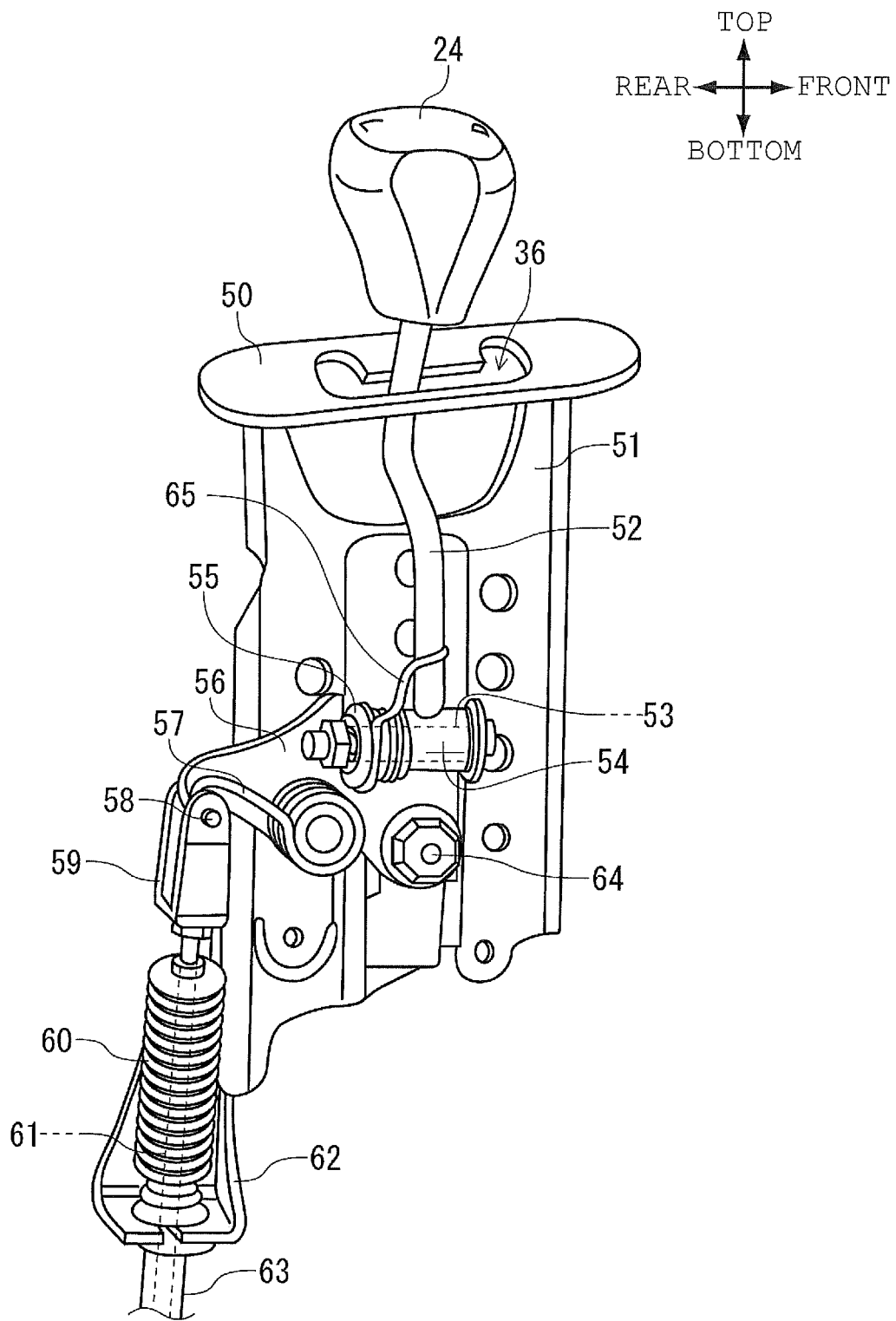
FIG. 4 is a view for explaining the configuration of a switching lever for a sub-transmission.

FIG. 4 is a view for explaining the configuration of the switching lever 24 for the sub-transmission. The switching lever 24 for the sub-transmission is a manual operator for switching the meshing of the gears of the sub-transmission by pushing or pulling a wire.

The switching lever 24 is attached to a base plate 51 fixed on the vehicle body side, and can be operated along the gate 36 of a gate plate 50 provided in an upper portion of the base plate 51. When the shift lever 24 is moved to the drive position (D), a turning arm 56 pivotally supported on the base plate 51 by a pivot 64 turns in a clockwise direction in the drawing to pull a wire 61 in a cable 63 in an upward direction in the drawing. On the other hand, when the shift lever 24 is moved to the low position (L), the turning arm 56 turns in a counterclockwise direction in the drawing to push down the wire 61 to the left in the drawing. A play adjustment mechanism 59 pivotally supported by the turning arm 56 is attached to an upper end portion of the wire 61. An upper end portion of the cable 63 is supported by a cable support base 62 fixed to the base plate 51. A rubber cover 60 is provided around a portion of the wire 61 which protrudes from the cable 63.

The turning arm 56 is spring-biased in a clockwise direction in the drawing (toward the drive position side) by biasing means made of a coil spring 57. Accordingly, when the switching lever 24 is moved to the low position, a force resisting the biasing force of the coil spring 57 is required. Moreover, a transfer shaft 52 of the switching lever 24 is configured to be movable to lateral grooves of the gate 36 in such a manner that a rotary shaft 53 inserted into a tubular portion 54 is pivotally supported by a rotary shaft support stay 55 fixed to the base plate 51. The transfer shaft 52 is spring-biased to the left with respect to the lateral direction of the vehicle by a coil spring 65. Thus, when the switching lever 24 is moved to the drive position (D) or the low position (L), the switching lever 24 engages the lateral groove. To operate the switching lever 24 again, the operation of releasing the switching lever 24 from the groove against the biasing force of the coil spring 65 is required. Accordingly, an operating error is prevented.

FIG. 5 is a cross-sectional view of the power unit P according to the present embodiment. In the power unit P, the rotational power of the engine E is transmitted to the twin clutch TCL of the main transmission TM1 through a centrifugal clutch 81, and the output of the main transmission TM1 obtained by speed conversion is outputted from the final output shaft 89 through the sub-transmission TM2.

The engine E is a publicly-known four-cycle water-cooled single-cylinder internal combustion engine in which a connecting rod 79 is swingably attached to a piston 78 reciprocating in a cylinder 77, and in which a big end of the connecting rod 79 is rotatably attached to a crankpin of a crankshaft 83. The reciprocating motion of the piston 78 is converted to the rotating motion of the crankshaft 83.

A cylinder head 74, which houses a valve train of an intake valve 73 and an exhaust valve 75, is fixed to an upper portion of the cylinder 77. A throttle body 71, which includes a butterfly throttle valve 70 disposed upstream of an injector 72 of a fuel injection device, is attached to an intake port of the cylinder head 74. On the other hand, an exhaust pipe 76 is attached to an exhaust port of the cylinder head 74.

A centrifugal clutch 81 for transmitting the rotational power of the crankshaft 83 to a primary drive gear 82 when the number of revolutions per unit time of the crankshaft 83 reaches a predetermined number or more is installed on an end portion of the crankshaft 83 on the left in the drawing, which is rotatably supported by a crankcase 90. On the other hand, an electric power generator 98 is attached to an end portion of the crankshaft 83 on the right in the drawing. A starter motor, which rotates the crankshaft 83 only at a start by meshing a gear, is disposed on the electric power generator 98.

The main transmission TM1 is configured such that five-forward-speed gear shifting is carried out using plural pairs of speed-changing gears G disposed between a main shaft 84 and a countershaft 91. Moreover, the main transmission TM1 is configured such that reverse driving can also be carried out using a reverse gear provided on an unillustrated shaft for reverse.

A twin clutch TCL including a first clutch CL1 and a second clutch CL2 is disposed at an end portion of the main transmission TM. The main shaft 84 of the main transmission TM1 has a double structure including an inner main shaft 86 and an outer main shaft 85. The rotational driving force transmitted from the primary drive gear 82 to a primary driven gear 88 is transmitted to the inner main shaft 86 through the first clutch CL1 as well as to the outer main shaft 85 through the second clutch CL2. The inner main shaft 86 supports odd numbered gear stages (first speed, third speed, and fifth speed), and the outer main shaft 85 supports even numbered gear stages (second speed and fourth speed). A shift drum (not shown) for selecting a speed-changing gear is driven by a shift motor connected to a control unit 200, and the twin clutch TCL is controlled by a shift solenoid and a shift valve connected to the control unit 200. Thus, the gear for transmitting the driving force can be speedily switched to an adjacent gear by switching the state of connection of the twin clutch TCL.

The sub-transmission TM2 switches between a drive-side gear pair having a normal reduction ratio and a low-side gear pair having a larger reduction ratio than the drive-side gear pair, thus outputting the output of the countershaft 91 to a final output shaft 80 selectively at one of two different gear ratios. A low-side drive gear 96 and a drive-side drive gear 97 are rotatably supported by an extension shaft 95 coupled to an end portion of the countershaft 91. On the other hand, a low-side driven gear 92 and a drive-side driven gear 93 are non-rotatably fixed to the final output shaft 89. A gear shifting mechanism 94 selects which one of the two pairs of speed-changing gears to use for transmitting the rotational driving force.

Figure 6A:
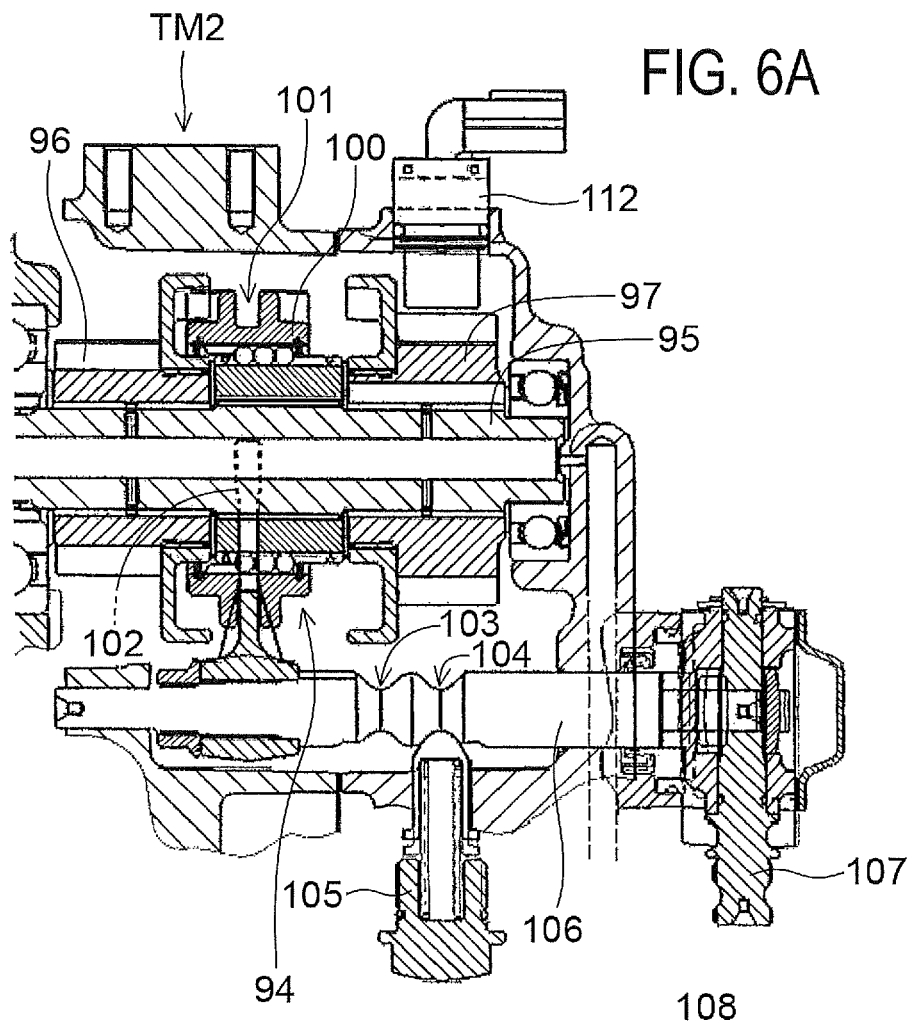
FIGS. 6A and 6B include cross-sectional views of the sub-transmission.
Figure 6B:
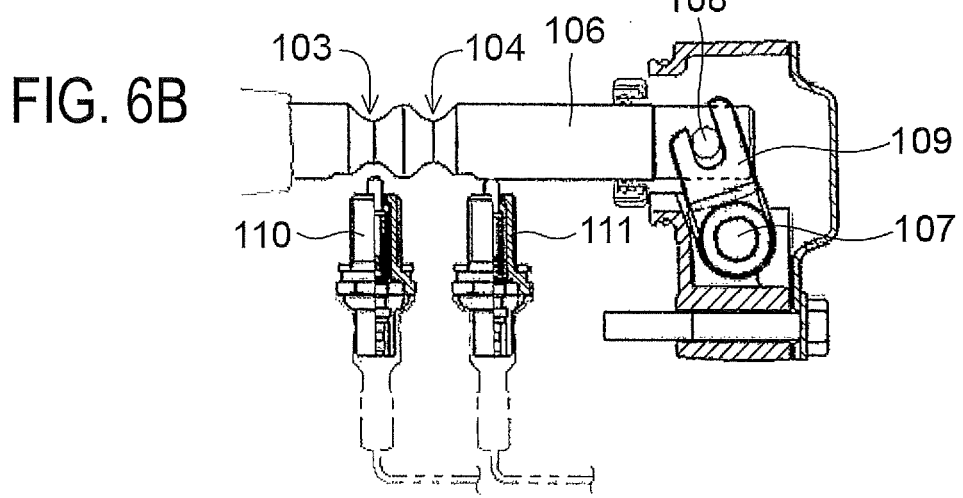

FIGS. 6A and 6B include cross-sectional views of the sub-transmission TM2. As shown in FIG. 6A, the gear shifting mechanism 94 includes a slide shifter 100 non-rotatably disposed on the extension shaft in an axially slidable manner. When a slider 100 is slid in the axial direction to engage a dog clutch between the low-side drive gear 96 or the drive-side drive gear 97 and the slider 100, the driving force can be transmitted. A groove 101 which a tip of a shifter fork 102 engages is formed in the slide shifter 100. The slide shifter 100 slides in the axial direction in accordance with the reciprocating motion of a shift shaft 106 supporting the shifter fork 102. A rotational speed sensor 112 for sensing the number of revolutions per unit time of the extension shaft 95 is disposed in the vicinity of the drive-side drive gear 97.

Referring also to FIG. 6B, the shift shaft 106 reciprocates in accordance with the operation of the switching lever 25 for the sub-transmission TM2. When the switching lever 24 is moved to the drive position (D), the wire 61 is pulled, and the driving shaft 107 is turned in a clockwise direction in the drawing by the wire 61. An arm member 109 which engages a pin 108 passing through an end portion of the shift shaft 106 is fixed to the driving shaft 107. Thus, the motion of the switching lever 24 moving toward the drive position (D) is converted to the motion of the shift shaft 106 sliding to the right in the drawing. On the other hand, when the shift lever 24 is moved to the low position (L), the driving shaft is turned in a counterclockwise direction in the drawing to slide the shift shaft 106 to the left in the drawing, and the slide shifter 101 and the low-side drive gear 96 mesh with each other (state shown in the drawing).

The shift shaft 106 has grooves 103 and 104 for providing detents for the shift shaft 106. In the vicinity of the shift shaft 106, a detent mechanism 105 having a contact portion spring-biased toward an outer circumferential surface of the shift shaft 106 is fixed in place. The position where the shift shaft 106 is located when the contact portion of the detent mechanism engages the groove 103 or 104 is matched with the position where the shift shaft 106 is located when the slide shifter 100 meshes the low-side drive gear 96 or the drive-side drive gear 97. Thus, detents for shift positions are provided.

Moreover, the grooves 103 and 104 are also used to sense the shift position of the sub-transmission TM2 in cooperation with a low-side shift sensing switch 110 and a drive-side shift sensing switch 111 fixed to a transmission case. Each of the two switches 110 and 111 as sub-transmission shift position sensing means has a sensor shaft disposed to be extendable and retractable and spring-biased in the protruding direction, and is configured to be switched from off to on by the sensor shaft entering a protruding state.

In the low position shown in the drawing, the low-side shift sensing switch 110 corresponds to the groove 103 in an on state, and the drive-side shift sensing switch 111 is in contact with the outer circumferential surface of the shift shaft 106 in an off state. On the other hand, when the shift shaft 106 is slid to the drive position, the low-side shift sensing switch 110 enters an off state, and the drive-side shift sensing switch 111 corresponds to the groove 104 in an on state. Thus, it is sensed that the shift position of the sub-transmission TM2 is the drive position.

Figure 7:
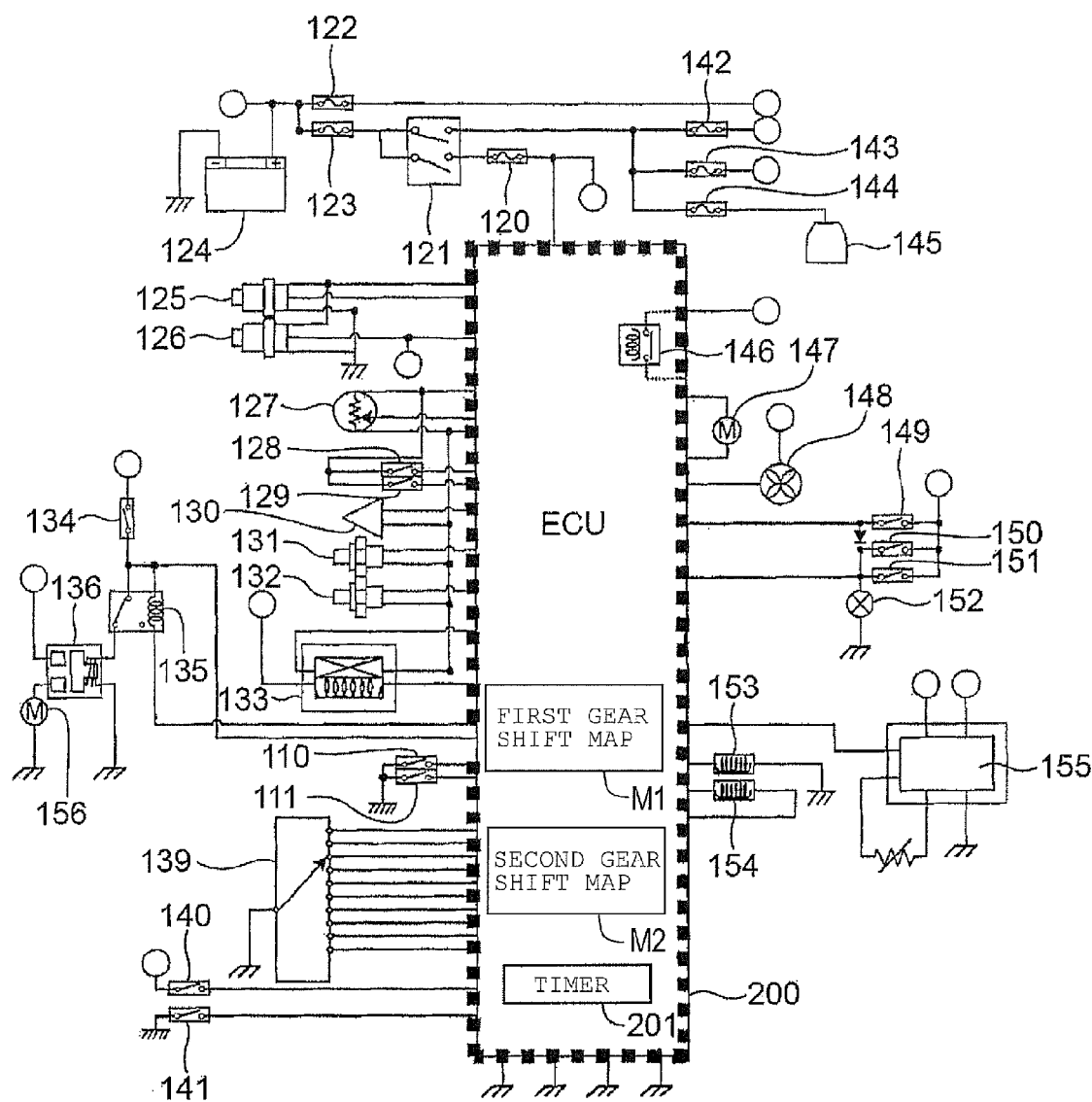
FIG. 7 is a block diagram showing the configuration of a control system of the ATV.

FIG. 7 is a block diagram showing the configuration of a control system of the ATV 1. An ECU 200 as a central control unit is supplied with electric power from a battery 124 when a main switch 121 is on. A main fuse 123 is disposed upstream of the main switch 121, and a main switch fuse 120 is disposed downstream of the main switch. Further, an electrical system fuse 122 connected to a fan motor 148 and a fuel cut relay 146 is disposed downstream of the battery 124, and a lamp fuse 142 and a fuse 144 for an accessory socket 145 are disposed downstream of the main switch 121.

When the engine is started, the starter switch 134 is operated in a state in which the main switch 121 is on. In the case where the shift lever is at the P position, an inhibitor relay 135 grants permission, a starter magnetic switch 136 is driven, and a starter motor 156 starts rotating.

Moreover, a motor 147 of an oil pump for the twin clutch; a fan motor 148 of a radiator; stop signal switches 149 and 150 and a stop lamp switch 151 for turning on a stop lamp 152; and a meter instrument 155 are connected to the ECU 200.

The hydraulic twin clutch according to the present embodiment is configured such that a destination which receives a hydraulic pressure supplied from the electric oil pump is switched using a shift solenoid 153, and that the magnitude of the supplied hydraulic pressure is adjusted using a linear solenoid 154. These solenoids 153 and 154 are also controlled by the ECU 200.

The ECU 200 includes a first gear shift map M1 and a second gear shift map M2 specifying the gear shift timing of the main transmission TM1 and a timer 201 for measuring a predetermined time. The first gear shift map M1 and the second gear shift map M2 are map data stored on a nonvolatile memory or the like.

Moreover, a front wheel vehicle speed sensor 125 and a rear wheel vehicle speed sensor 126; a throttle opening degree sensor 127; a shift-up switch 128 and a shift-down switch 129 for sensing operations of shift paddles 31L and 31R during semiautomatic driving; and an air temperature sensor 130, a water temperature sensor 131, an oil temperature sensor 132, and an O2 sensor 133 for use in controlling a fuel injection device and an ignition device are also connected to the ECU 200.

Furthermore, a low-side shift sensing switch 110 and a drive-side shift sensing switch 111 as sub-transmission shift position sensing means for sensing the shift position of the sub-transmission TM2; a gear position sensor 139 as main transmission shift position sensing means for sensing the rotary position of the shift drum; a mode detection sensor 140 for sensing the automatic/semiautomatic mode of the main transmission TM1; and an R position sensor 141 for sensing the selection the R (reverse) position of the main transmission TM1 are also connected to the ECU 200.

Figure 8:
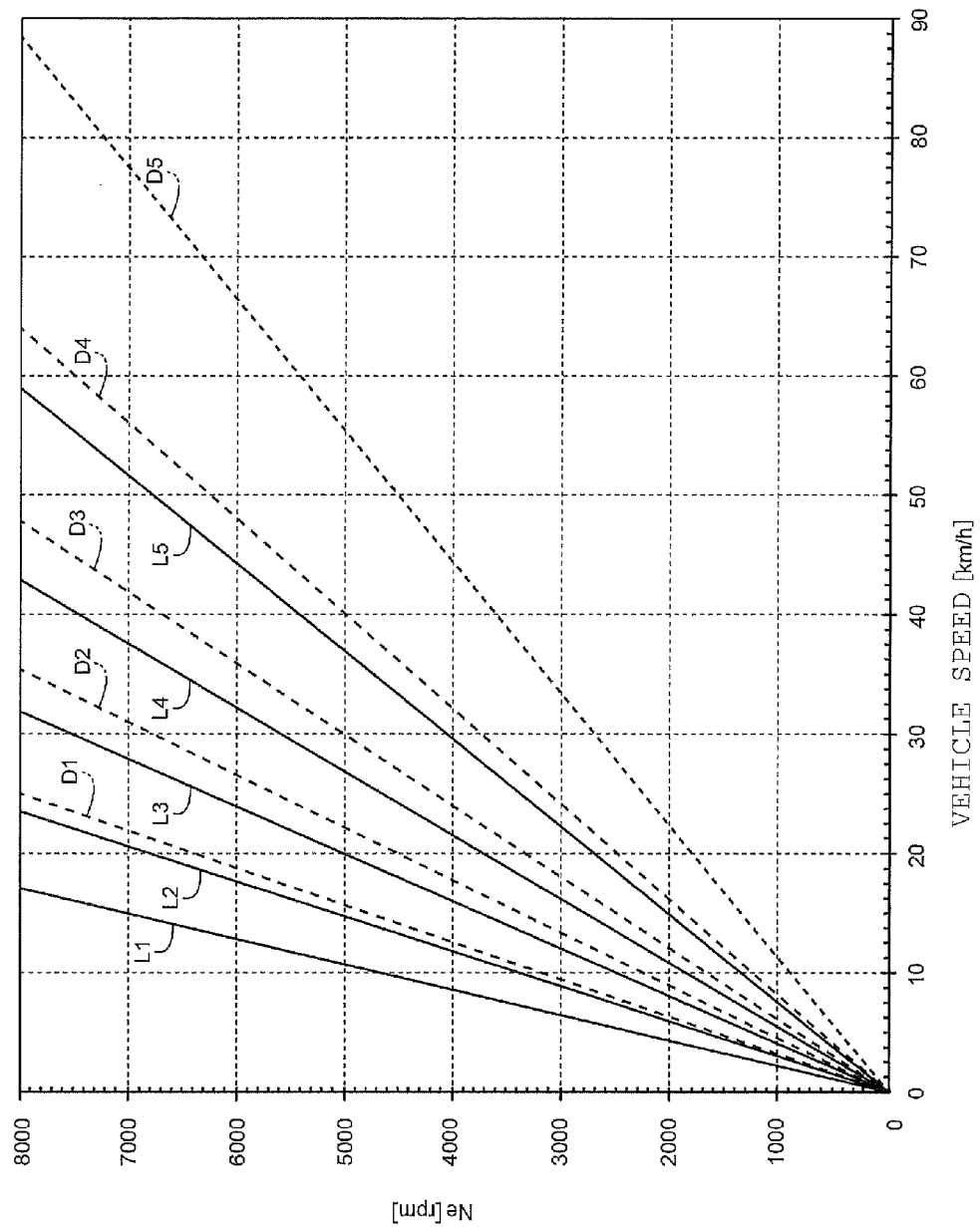
FIG. 8 is a speed diagram showing the relationship between the gear position of the transmission and the speed of the vehicle.

FIG. 8 is a speed diagram showing the relationship between the gear position of the transmission TM and the speed of the vehicle. This speed diagram contains lines (solid lines D1, D2, D3, D4, and D5 in the drawing) for first to fifth speeds of the main transmission when the sub-transmission TM2 is at the drive position (D), and lines (broken lines L1, L2, L3, L4, and L5 in the drawing) for first to fifth speeds of the main transmission when the sub-transmission TM2 is at the low position (L). The sub-transmission TM2 is disposed downstream of the main transmission TM1 and configured to convert the output of the main transmission TM1 selectively at one of two different gear ratios. The distances between each related speed-changing gears are not changed. However, for example, the second-speed gear when the transmission TM2 is at the low position (L) is lower geared than the first-speed gear at the drive position. The first-speed gear at the low position is used as "super low" particularly suitable for travel on rough terrain or slopes.

The transmission TM according to the present embodiment is configured to sense the gear shifting of the sub-transmission TM by a manual operation and switch the gear shift map which is used to determine the gear shift timing of the main transmission TM1. Specifically, in the case where the sub-transmission TM2 is at the drive position (D), the first gear shift map M1 for the drive position (D) is used; and, on the other hand, when switching to the low position (L) is sensed based on sensing signals from the low-side shift sensing switch 110 and the drive-side shift sensing switch 111, switching is performed to the second gear shift map M2 set for lower speeds than the first gear shift map M1. Thus, switching between the gear shift maps for the main transmission can be automatically performed in accordance with the manual switching of the sub-transmission, and the gear shifting of the transmission configured by combining the automatic-type main transmission and the manual-type sub-transmission can be smoothly carried out.

It should be noted that the first gear shift map M1 and the second gear shift map M2 can be determined in advance by experiment or the like and stored on, for example, a storage unit of the ECU 200.

Figure 9:
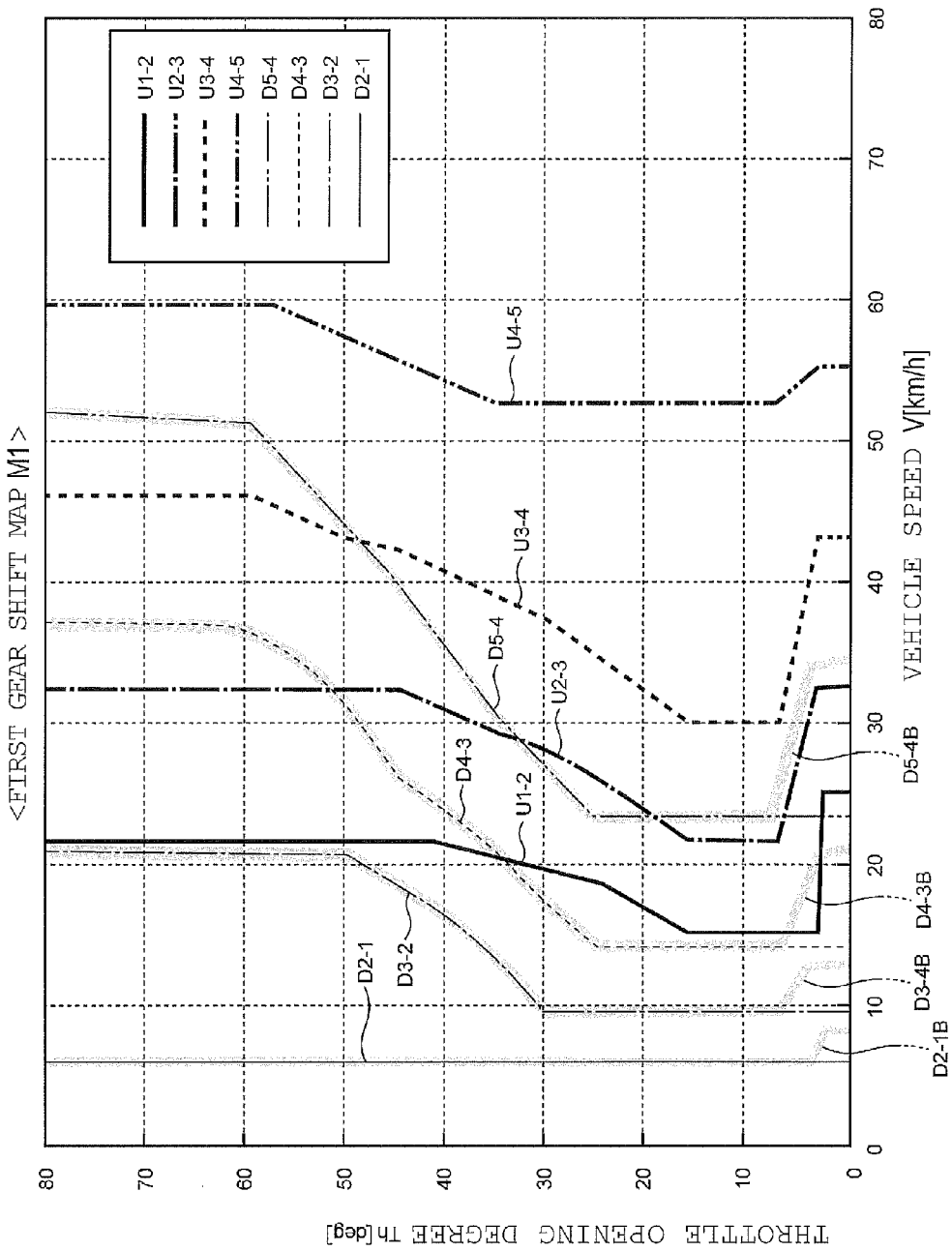
FIG. 9 is a first gear shift map for a main transmission.
Figure 10:
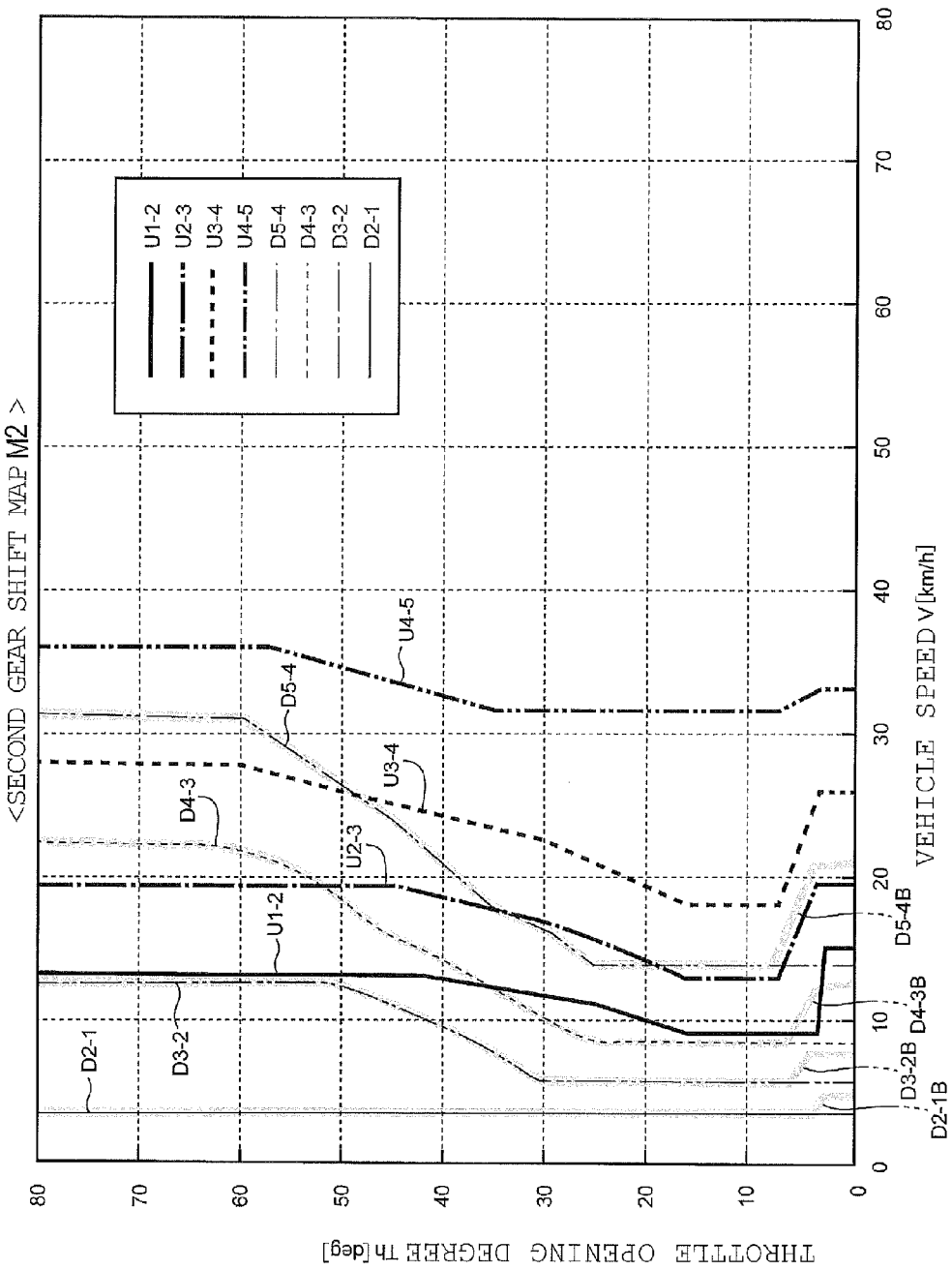
FIG. 10 is a second gear shift map for the main transmission.

FIG. 9 is the first gear shift map M1 for the main transmission TM1. FIG. 10 is the second gear shift map M2 for the main transmission TM1. Each of the maps M1 and M2 is a data map which specifies gear shift timing using the number of revolutions per unit time of the engine Th and vehicle speed V as parameters, and includes shift-up boundary lines (U1-2, U2-3, U3-4, and U4-5) which specify gear shift timing for upshifting and shift-down boundary lines (D5-4, D4-3, D3-2, and D2-1) which specify gear shift timing for downshifting.

Further, in the present embodiment, shift-down boundary lines (D5-4B, D4-3B, D3-2B, and D2-1B) for downshifting involving braking are also specified (hatched bold lines in the drawing). The braking of the vehicle is sensed based on a fact such as the on state of a brake lamp switch. According to shift-down boundary lines for braking-involving driving, in the case where the throttle opening degree Th is low and braking is being performed, downshifting is carried out at higher speed compared to normal driving in which braking is not performed. Thus, shift-down control can be performed in accordance with a driver's intention to decrease the speed.

With regard to the shift-up boundary lines, for example, the line U2-3 specifies gear shift timing (engaging/disengaging timing of twin clutch TCL) for upshifting from the second speed to the third speed. Moreover, with regard to the shift-down boundary lines, for example, the line D3-2 specifies gear shift timing for downshifting from the third speed to the second speed.

Further, the shift-up boundary lines and the shift-down boundary lines for the low position (L) of the sub-transmission TM2 are defined at lower speed positions compared to the shift-up boundary lines and the shift-down boundary lines for the drive position (D), respectively. Thus, the automatic gear shifting of the main transmission TM1 can be carried out with the gear shift timing according to the gear position of the sub-transmission TM2.

Figure 11:
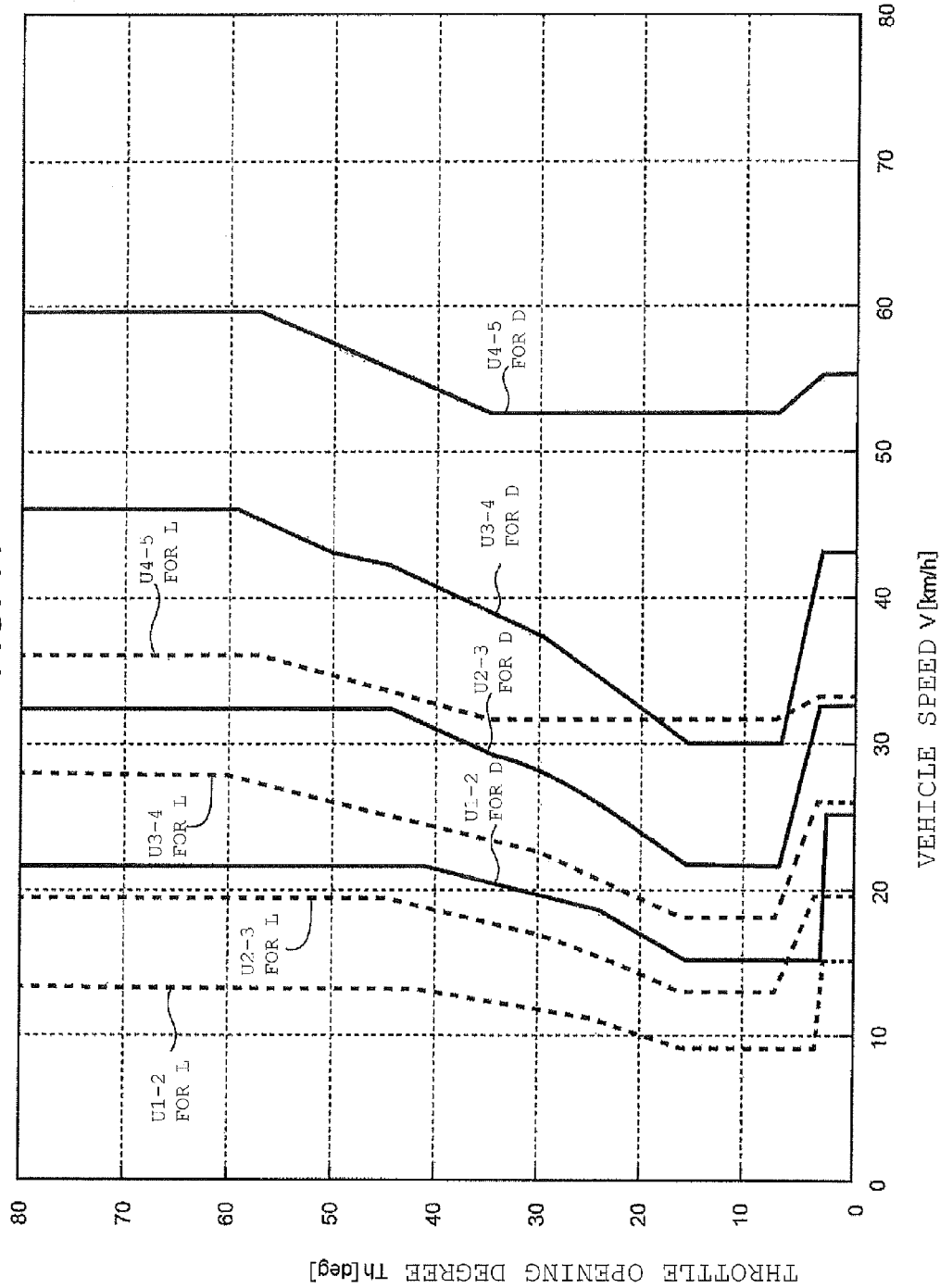
FIG. 11 is a diagram for comparing shift-up boundary lines corresponding to the drive position and shift-up boundary lines corresponding to the low position.

FIG. 11 is a diagram for comparing the shift-up boundary lines corresponding to the drive position (D) and the shift-up boundary lines corresponding to the low position (L). As shown in the drawing, the shift-up boundary lines corresponding to L are set at lower speed positions compared to the shift-up boundary lines corresponding to D. The shift-down boundary lines also has the same relationship.

Accordingly, when the sub-transmission is switched during travel at a predetermined throttle opening degree and a predetermined vehicle speed, the main transmission may exceed a gear shifting boundary line due to this switching. To cope with this, in the present embodiment, in the case where the sub-transmission TM2 is switched during travel, switching to the first map M1 or the second map M2 is carried out after a predetermined time T (e.g., two seconds) elapses from the switching.

This is because to cope with the possibility that the automatic gear shifting of the main transmission TM1 instantly performed in response to the gear shifting of the sub-transmission TM2 may cause a gear shifting jolt, switching between the gear shift maps is performed after standby time of the predetermined time T measured by the timer 201 to settle the number of revolutions per unit time of the engine and reduce a gear shifting jolt. This prevents a large speed reduction, which is not intended by the rider, when the sub-transmission T2 is switched from the D position to the L position during travel, and prevents a low-speed rotation state that is not intended by the rider and a driving force reduction when the sub-transmission T2 is switched from the L position to the D position.

Figure 12:
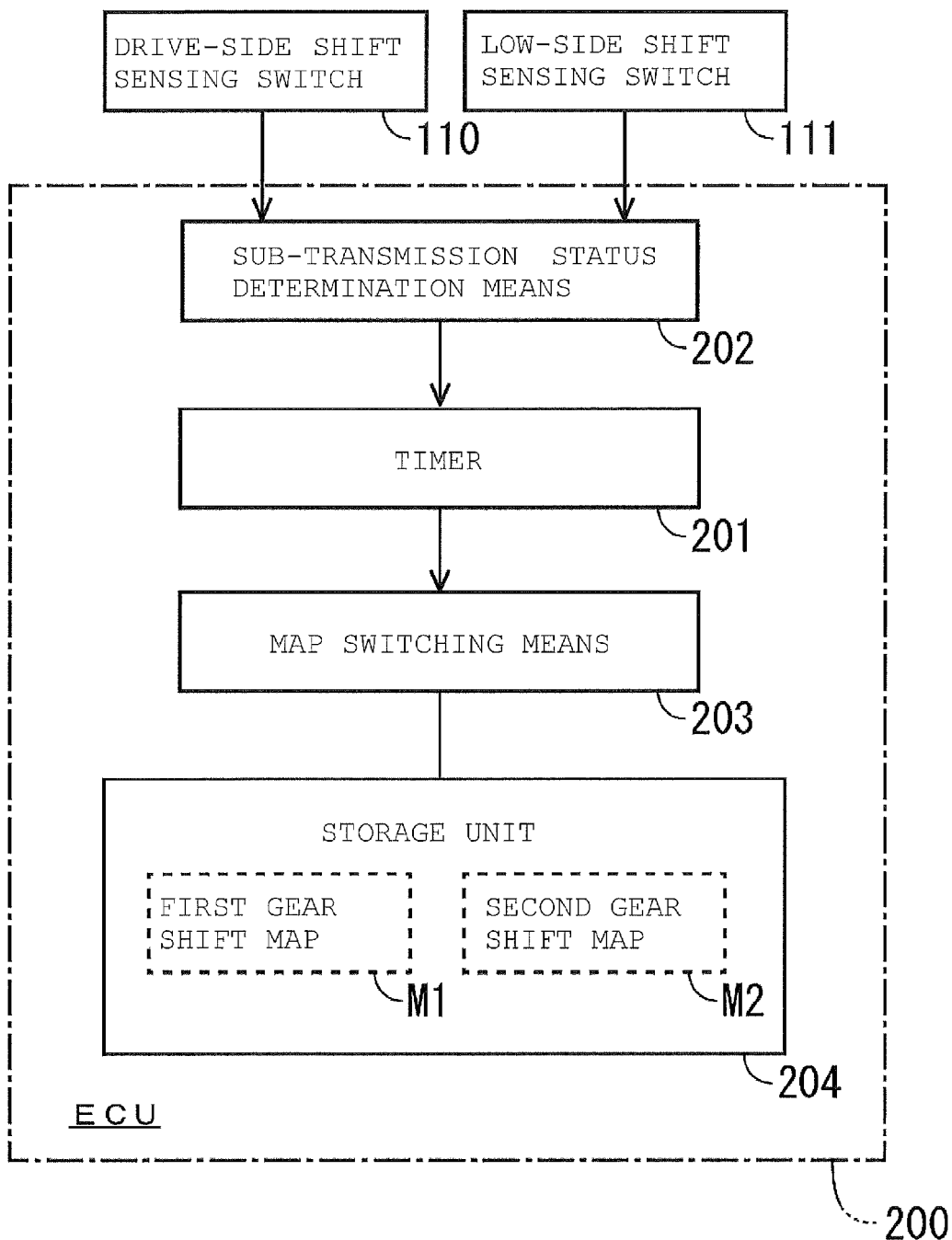
FIG. 12 is a functional block diagram showing the configuration around map switching means.

FIG. 12 is a functional block diagram showing the configuration around map switching means 203 for performing switching between the gear shift maps M1 and M2. The ECU 200 (see FIG. 7) includes, in addition to a storage unit 204 for storing the first map M1 and the second map M2, the timer 201, sub-transmission status determination means 202, and the map switching means 203.

The drive-side shift sensing switch 110 and the low-side shift sensing switch 111 collectively function as sub-transmission shift position sensing means using outputs from the two switches. Specifically, in the case where the drive-side shift sensing switch 110 is in an on state and the low-side shift sensing switch 111 is an off state, the transmission TM2 is determined to be at the drive position; and, on the other hand, in the case where the drive-side shift sensing switch 110 is in an off state and the low-side shift sensing switch 111 is in an on state, the transmission TM2 is determined to be at the low position. The determination of the shift position based on the signals from the two switches 110 and 111 is performed by the sub-transmission status determination means 202.

When the sub-transmission status determination means 202 determines based on switch outputs from the drive-side shift sensing switch 110 and the low-side shift sensing switch 111 that the transmission TM2 has been switched, the timer 201 starts time measurement. The map switching means 203 which is triggered by the event that the time measured by the timer 201 reaches the predetermined time T, performs switching between the gear shift maps M1 and M2.

FIG. 13 is a timing diagram showing the timing of switching between the gear shift maps M1 and M2. At time t=O, the sub-transmission TM2 is at the drive position. At this time, the drive-side shift sensing switch 110 is in an on state, and the low-side shift sensing switch 111 is in an off state.

Then, the driver starts operating the switching lever 24 for the sub-transmission TM. At time t1, the drive-side shift sensing switch 110 is switched from the on state to an off state. It should be noted that in this timing diagram, the driver is assumed to operate the switching lever 24 at a constant speed.

At time t1, the drive-side shift sensing switch 110 is switched to the off state, but the low-side shift sensing switch 111 remains in the off state. This is because the two switches 110 and 111 are aligned in the axial direction of the shift shaft 106 as shown in FIGS. 6A and 6B so that the two switches 110 and 111 may be prevented from being simultaneously switched between on and off. This makes it possible to sense the presence of the shift shaft 106 at an intermediate position in which the shift shaft 106 does not yet complete a stroke to such a predetermined position that the dog clutch of the slide shifter 100 meshes.

After that, at time t2, in response to the movement of the shift shaft 106 to the predetermined low position, the low-side shift sensing switch 111 is switched to an on state. The sub-transmission status determination means 202 (see FIG. 12) triggered by the low-side shift sensing switch 111 being switched to the on state, issues a drive command. In response to the drive command, the timer 201 starts time measurement. Then, after the predetermined time T has elapsed from time t2, at time t3, the map switching means 203 performs gear shift map switching from the first gear shift map M1 to the second gear shift map M2.

In this timing diagram, after time t3, an operation for switching the switching lever 24 from the low position to the drive position is carried out again. In this case, similarly to the above case, the low-side shift sensing switch 111 is switched from an on state to an off state at time t4, and then the drive-side shift sensing switch 110 is switched from an off state to an on state at time t5. Based on the drive command from the sub-transmission status determination means 202, the timer 201 triggered by both of the signals from the two switches 110 and 111 being switched, starts measuring the predetermined time from time t5. Then, after the predetermined time T has elapsed from time t5, at time t6, the map switching means 203 performs gear shift map switching from the second gear shift map M2 to the first gear shift map M1.

It should be noted that the configurations of the ATV, the power unit, the engine, the centrifugal clutch, and the ECU; the structures and forms of the twin clutch and the transmission; the number of speeds and the gear ratios of each of the main transmission and the sub-transmission; settings of the first map and the second map; the shapes and structures of the shift lever for the main transmission and the switching lever for the sub-transmission; and the like are not limited to those of the above-described embodiment, but various modifications can be made thereto. The vehicle transmission according to the embodiment of the present invention can be applied not only to four-wheeled ATVs but also to various kinds of vehicles including saddle-type three- or two-wheeled vehicles.

A first aspect of the embodiment of the present invention provides a vehicle transmission (TM) including: a main transmission (TM1) configured to output the number of revolutions per unit time of a power source (P) at a predetermined gear ratio by performing switching between a plurality of speed-changing gear pairs (G); a sub-transmission (TM2) disposed downstream of the main transmission (TM1) and configured to convert an output of the main transmission (TM1) selectively at one of two different gear ratios, the sub-transmission (TM2) being configured to be switched by a manual operation; main transmission shift position sensing means (139) for sensing a gear position of the main transmission (TM1); and sub-transmission shift position sensing means (110, 111) for sensing a gear position of the sub-transmission (TM2). The main transmission (TM1) is an automatic transmission which performs gear shifting with gear shift timing according to one of gear shift maps (M1, M2), the one gear shift map being selected in accordance with a throttle opening degree (Th) of a vehicle and a vehicle speed (V). The sub-transmission (TM2) is configured to be switched between a drive position (D) and a low position (L) having a larger reduction ratio than the drive position (D). The gear shift maps (M1, M2) include a first gear shift map (M1) corresponding to the drive position (D) of the sub-transmission (TM2) and a second gear shift map (M2) corresponding to the low position (L) thereof. The vehicle transmission (TM) further includes map switching means (203) for performing switching between the first gear shift map (M1) and the second gear shift map (M2) in accordance with sensing signals from the sub-transmission shift position sensing means (110, 111).

A second aspect of the embodiment of the present invention provides the vehicle transmission according to the first aspect, wherein each of the first gear shift map (M1) and the second gear shift map (M2) includes a shift-up boundary line (U1-2, U2-3, U3-4, U4-5) specifying gear shift timing for upshifting and a shift-down boundary line (D5-4, D4-3, D3-2, D2-1) specifying gear shift timing for downshifting, and the shift-up boundary line (U1-2, U2-3, U3-4, U4-5) and the shift-down boundary line (D5-4, D4-3, D3-2, D2-1) of the second gear shift maps (M2) are set at lower speed positions than those of the first gear shift map (M1).

A third aspect of the embodiment of the present invention provides the vehicle transmission according to any one of the first and second aspects, wherein switching between the first map (M1) and the second map (M2) is carried out after a predetermined time (T) elapses from completion of switching of the sub-transmission (TM2).

A fourth aspect of the embodiment of the present invention provides the vehicle transmission according to any one of the first to third aspects, wherein the main transmission (TM1) includes a twin clutch (TCL) for performing switching between adjacent speed-changing gears by alternately engaging and disengaging a first clutch (CL1) and a second clutch (CL2).

According to the first aspect, the main transmission is an automatic transmission which performs gear shifting with gear shift timing according to one of gear shift maps, the one gear shift map being selected in accordance with a throttle opening degree of a vehicle and a vehicle speed; the sub-transmission is configured to be switched between a drive position and a low position having a larger reduction ratio than the drive position; the gear shift maps include a first gear shift map corresponding to the drive position of the sub-transmission and a second gear shift map corresponding to the low position thereof; and the vehicle transmission further includes map switching means for performing switching between the first gear shift map and the second gear shift map in accordance with sensing signals from the sub-transmission shift position sensing means. Accordingly, switching between the gear shift maps for the main transmission can be automatically performed, and the gear shifting of the transmission configured by combining the automatic-type main transmission the manual-type sub-transmission can be smoothly carried out.

According to the second aspect, each of the first gear shift map and the second gear shift map includes shift-up boundary lines specifying gear shift timing for upshifting and shift-down boundary lines specifying gear shift timing for downshifting, and the shift-up boundary lines and the shift-down boundary lines of the second gear shift maps are set at lower speed positions than those of the first gear shift map. Accordingly, the automatic gear shifting of the main transmission can be carried out with the gear shift timing according to the gear position of the sub-transmission.

According to the third aspect, switching between the first map and the second map is carried out after a predetermined time elapses from completion of switching of the sub-transmission. When the sub-transmission is switched during travel at a predetermined throttle opening degree and a predetermined vehicle speed, the main transmission may exceed a gear shifting boundary line due to this switching. At this time, the instant and automatic gear shifting of the main transmission may cause a gear shifting jolt. To cope with this, switching between the gear shift maps is performed after standby time of the predetermined time. Thus, the gear shifting jolt can be reduced.

According to the fourth aspect, the main transmission includes a twin clutch for performing switching between adjacent speed-changing gears by alternately engaging and disengaging a first clutch and a second clutch. Accordingly, the gear shifting of the main transmission can be speedily carried out, and, when the sub-transmission is switched, gear shifting to an appropriate gear ratio can be smoothly carried out.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle transmission comprising:
a main transmission configured to output the number of revolutions per unit time of a power source at a predetermined gear ratio by performing switching between a plurality of speed-changing gear pairs;
a sub-transmission disposed downstream of the main transmission and configured to convert an output of the main transmission selectively at one of two different gear ratios, the sub-transmission being configured to be switched by a manual operation;
main transmission shift position sensing means for sensing a gear position of the main transmission; and
sub-transmission shift position sensing means for sensing a gear position of the sub-transmission,
wherein the main transmission is an automatic transmission which performs gear shifting with gear shift timing according to one of gear shift maps, the one gear shift map being selected in accordance with a throttle opening degree of a vehicle and a vehicle speed,
the sub-transmission is configured to be switched between a drive position and a low position having a larger reduction ratio than the drive position,
the gear shift maps comprise a first gear shift map corresponding to the drive position of the sub-transmission and a second gear shift map corresponding to the low position thereof, and the vehicle transmission further comprises map switching means for performing switching between the first gear shift map and the second gear shift map in accordance with sensing signals from the sub-transmission shift position sensing means.

2. The vehicle transmission according to claim 1, wherein each of the first gear shift map and the second gear shift map comprises a shift-up boundary line specifying gear shift timing for upshifting and a shift-down boundary line specifying gear shift timing for downshifting, and
the shift-up boundary line and the shift-down boundary line of the second gear shift maps are set at lower speed positions than those of the first gear shift map.

3. The vehicle transmission according to claim 1, wherein switching between the first map and the second map is carried out after a predetermined time elapses from completion of switching of the sub-transmission.

4. The vehicle transmission according to claim 1, wherein the main transmission comprises a twin clutch for performing switching between adjacent speed-changing gears by alternately engaging and disengaging a first clutch and a second clutch.

5. A vehicle transmission comprising:
a main transmission configured to output rotational drive force generated by a power source at a predetermined gear ratio by selecting a main transmission gear position among a plurality of speed-changing gear pairs, the main transmission being an automatic transmission configured to perform gear shifting according to a gear shift map selected between a first gear shift map and a second gear shift map in accordance with a throttle opening degree and a vehicle speed;
a sub-transmission configured to change rotational speed of the rotational drive force output from the main transmission by manually selecting a sub-transmission gear position between a drive position and a low position having a reduction ratio larger than a reduction ratio of the drive position, the first gear shift map corresponding to the drive position, the second gear shift map corresponding to the low position;
a sub-transmission shift position sensor configured to sense the sub-transmission gear position of the sub-transmission; and
a map switching device configured to perform switching between the first gear shift map and the second gear shift map in accordance with sensing signals from the sub-transmission shift position sensor.

6. The vehicle transmission according to claim 5, further comprising:
a main transmission shift position sensor configured to sense the gear position of the main transmission.

7. The vehicle transmission according to claim 5, wherein each of the first gear shift map and the second gear shift map comprises a shift-up boundary line specifying gear shift timing for upshifting and a shift-down boundary line specifying gear shift timing for downshifting,
the shift-up boundary line of the second gear shift map is set at lower speed position than the shift-up boundary line of the first gear shift map, and
the shift-down boundary line of the second gear shift map is set at lower speed position than the shift-down boundary line of the first gear shift map.

8. The vehicle transmission according to claim 7, wherein each of the first gear shift map and the second gear shift map comprises an additional shift-down boundary line specifying gear shift timing for downshifting involving braking, and
the additional shift-down boundary line of the first gear shift map is set at higher speed position than the shift-down boundary line of the first gear shift map when the throttle opening degree is lower than a predetermined value and the braking is performed,
the additional shift-down boundary line of the second gear shift map is set at higher speed position than the shift-down boundary line of the second gear shift map when the throttle opening degree is lower than a predetermined value and the braking is performed.

9. The vehicle transmission according to claim 5, wherein switching between the first gear shift map and the second gear shift map is carried out after a predetermined time elapses from completion of switching of the sub-transmission.

10. The vehicle transmission according to claim 5, wherein the main transmission comprises a twin clutch for performing switching between adjacent speed-changing gears among the plurality of speed-changing gear pairs by alternately engaging and disengaging a first clutch and a second clutch.

11. A vehicle transmission comprising:
a main transmission configured to output rotational drive force generated by a power source at a predetermined gear ratio by selecting a main transmission gear position among a plurality of speed-changing gear pairs, the main transmission being an automatic transmission configured to perform gear shifting according to a gear shift map selected between a first gear shift map and a second gear shift map, the gear shift map being selected in accordance with throttle opening degree and a vehicle speed;
a sub-transmission configured to change rotational speed of the rotational drive force output from the main transmission by manually selecting a sub-transmission gear position between a drive position and a low position having a reduction ratio larger than a reduction ratio of the drive position, the first gear shift map corresponding to the drive position, the second gear shift map corresponding to the low position;
sub-transmission shift position sensing means for sensing the sub-transmission gear position of the sub-transmission; and
map switching means for performing switching between the first gear shift map and the second gear shift map in accordance with sensing signals from the sub-transmission shift position sensing means.

* * * * *